(No Model.)

F. H. SLEEPER.
LIFTING JACK.

No. 379,294.                    Patented Mar. 13, 1888.

Witnesses:
Edwin A. Finckel,
A. W. Bright.

Inventor:
Francis H. Sleeper.
by Wm H. Finckel
Asso. Atty.

UNITED STATES PATENT OFFICE.

FRANCIS H. SLEEPER, OF COATICOOK, QUEBEC, CANADA.

LIFTING-JACK.

SPECIFICATION forming part of Letters Patent No. 379,294, dated March 13, 1888.

Application filed February 18, 1887. Serial No. 228,133. (No model.) Patented in Canada July 30, 1886, No. 24,590.

*To all whom it may concern:*

Be it known that I, FRANCIS H. SLEEPER, of the town of Coaticook, in the Province of Quebec and Dominion of Canada, mechanic, a subject of Her Majesty Queen Victoria, have invented a new and useful Lifting Jack or Press, (for which I have obtained a patent in said Dominion of Canada, No. 24,590, bearing date July 30, 1886,) of which the following is a specification.

This invention has for its object the production of a novel and simple lifting-jack, one possessing great power and efficiency.

The lifting-jack herein described is composed of a base or standard closed at one end to form a seat, a lifting-piece fitted to slide in the base and provided with a screw-threaded hub, a lifting-screw which has one of its ends resting in the said seat and its other end engaging the threaded hub of the lifting-piece to elevate the said lifting-piece, and gearing wholly within the base to actuate the lifting-screw.

Figure 1:
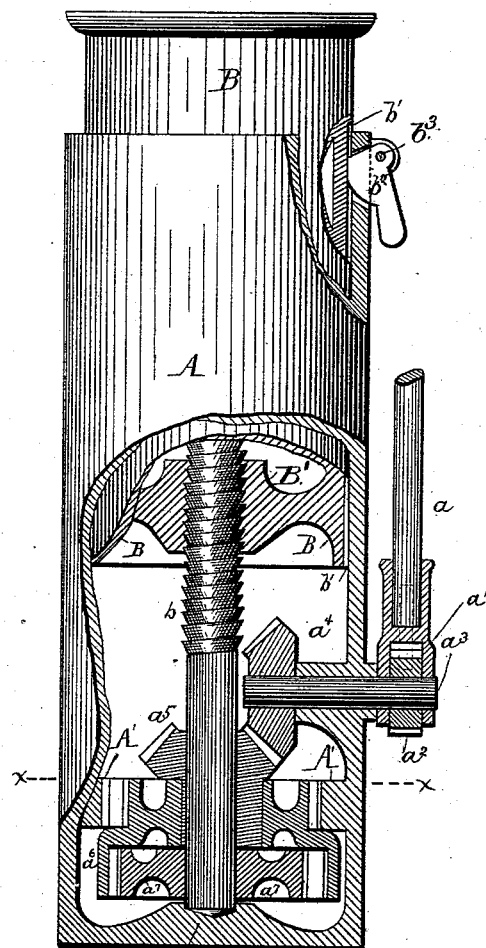
Figure 2:
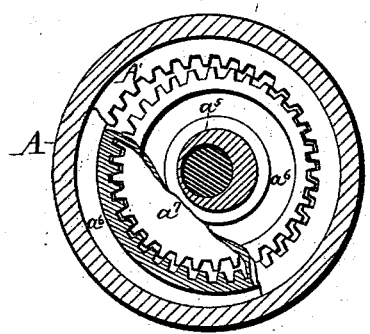

Figure 1 is a side elevation of my invention, partially broken out to show the actuating mechanism; and Fig. 2, a section of Fig. 1 on the line $x\ x$, looking down, and broken out at one side to show a portion of the gears $a^6\ a^7$.

In the accompanying drawings, A is a base or standard, of cast-iron or steel, closed at one end to form a step (see Fig. 1) for the lifting-screw $b$. A lifting-piece, B, is fitted to slide in the base A in such manner that it cannot rotate in the same, but can move freely up or down. This is accomplished by slotting the lifting-piece longitudinally, as at $b'$, in which slot the locking-ear $b^2$ enters, the said locking-ear $b^2$ being secured to any suitable projections from the base A by means of a pivot-pin, $b^3$.

The lifting-piece is provided at its top with a suitable cross-head, and has within it a hub, B', (partially shown in section in Fig. 1,) screw-threaded to receive one end of the lifting-screw $b$, the other end of the said screw resting in the step $c$ in the center of the closed end of the standard A. The screw $b$ has a gear, $a^7$, secured to its lower end, and a beveled gear, $a^5$, having a downwardly-extended hub, is loosely fitted eccentrically upon the screw and rests upon the gear $a^7$. The beveled gear $a^5$ is moved by a second gear, $a^4$, which is actuated by means of a pawl-carrying crank, $a'$, and ratchet $a^2$ upon the shaft $a^3$, to which the bevel-gear $a^4$ is attached. The pawl-carrying crank $a'$ is provided with a lever, $a$, which may be used to increase the leverage, and as the crank and ratchet are placed upon the horizontal shaft $a^3$ the lever, when used, moves in a vertical plane and is used in the same manner as the pump-lever of a hydraulic jack, and as the ratchet is double-acting it may be used either to raise or lower the lifting-piece B. The hub of the bevel-gear $a^5$ is turned to form an eccentric, the throw of which is equal to the difference in diameter between the gear A' and $a^6$. The gear $a^6$ is double, having external teeth that engage with those of the internal gear, A', which is integral with the base A, and internal teeth which engage with those of the gear $a^7$.

The operation of the jack is as follows: The crank $a'$ is turned in the required direction and gives its motion by means of the pawl and ratchet to the shaft $a^3$, and thence to the beveled gears $a^4$ and $a^5$. As the bevel-gear $a^5$ rotates about the screw $b$, the gear $a^6$, which is fitted loosely upon the eccentric-hub of the bevel $a^5$, is also carried about the screw $b$; but as the external teeth of the gear $a^6$ engage with those of the internal gear, A', the gear $a^6$ will be rotated on its axis only in proportion to the difference in the number of teeth in the gear A' and the external part of the gear $a^6$. As the gear $a^6$ so rotates on its axis its internal teeth engage with the teeth of the gear $a^7$ and cause it and the screw $b$, to which the said gear $a^7$ is fastened, to rotate in the same direction in proportion to the difference in the number of teeth in the gear $a^7$ and the internal part of the gear $a^6$. The screw $b$, as it rotates to the left or right, engages the screw-threaded hub B' and causes the lifting-piece to ascend and descend, and as the base A is of sufficient strength to prevent any cramping or binding, the whole power of the screw is brought to bear directly upon the work.

The screw and gearing, being entirely within the base A, are protected from dust or injury in any way, and can be kept well oiled, the friction being thereby much less in proportion to the power than in the ordinary form of lifting-jack.

I do not claim the particular shape of this lifting-jack or of its component parts; nor do I bind myself to any proportion or size of gearing, as it will be necessary to arrange the construction of the same according to the power required and the space to be occupied.

I claim—

1. In a lifting-jack, the base closed at one end to form a seat, and a lifting-piece fitted to slide in the base and provided with a screw-threaded hub, combined with a lifting-screw having one of its ends resting in the said seat and its other end engaging the threaded hub of the lifting-piece to elevate or depress the said lifting-piece and gearing wholly within the base to actuate the lifting screw, substantially as described.

2. In a lifting-jack, the base A, closed at one end to form a seat, $c$, and the internal gear, A′, combined with the lifting-screw $b$, and gear $a^7$, fast upon the said lifting-screw, and with gearing to operate the same, substantially as described.

3. In a lifting-jack, a base closed at one end and provided with an internal gear, A′, a lifting-piece, and a lifting-screw and its attached gear $a^7$, combined with the gear $a^4$, actuated by a pawl and ratchet, and the intermediate gears, $a^5$ and $a^6$, substantially as and for the purpose described.

4. In a lifting-jack, a base closed at one end and provided with an internal gear, A′, a lifting-piece sliding therein and slotted, as at $b'$, and the locking device, consisting of the ear $b^2$, pivoted at $b^3$, the said ear being adapted to enter said slot and lock the lifting-piece, and a lifting-screw and its attached gear $a^7$, combined with the gear $a^4$, actuated by a pawl and ratchet, and the intermediate gears, $a^5$ and $a^6$, substantially as and for the purpose described.

Coaticook, February 8, 1887.

FRANCIS H. SLEEPER.

Witnesses:
G. O. DOAK,
G. M. CHILD.